United States Patent
Ando

(10) Patent No.: US 11,414,047 B2
(45) Date of Patent: Aug. 16, 2022

(54) ACTIVATION SYSTEM AND ACTIVATION METHOD

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 16/835,509

(22) Filed: Mar. 31, 2020

(65) Prior Publication Data

US 2020/0361413 A1    Nov. 19, 2020

(30) Foreign Application Priority Data

May 17, 2019    (JP) .............................. JP2019-094026

(51) Int. Cl.
*B60R 25/24* (2013.01)
*G08G 1/00* (2006.01)

(52) U.S. Cl.
CPC ............. *B60R 25/24* (2013.01); *G08G 1/202* (2013.01)

(58) Field of Classification Search
CPC ....... B60R 25/24; G08G 1/202; G05D 1/0291
See application file for complete search history.

(56) References Cited

U.S. PATENT DOCUMENTS

| | | | | |
|---|---|---|---|---|
| 10,134,286 B1* | 11/2018 | Elswick | ................. | G08G 1/205 |
| 11,104,301 B2* | 8/2021 | Watanabe | ........... | B60R 25/2036 |
| 2015/0339928 A1* | 11/2015 | Ramanujam | ........... | G08G 1/202 |
| | | | | 701/23 |
| 2016/0090055 A1* | 3/2016 | Breed | ..................... | B60R 25/25 |
| | | | | 701/2 |
| 2019/0118805 A1* | 4/2019 | Lim | ....................... | G07C 5/008 |
| 2019/0186947 A1* | 6/2019 | Rockmore | ......... | G01C 21/3629 |
| 2020/0142395 A1* | 5/2020 | Delbari | ................. | B60W 30/06 |

FOREIGN PATENT DOCUMENTS

| | | |
|---|---|---|
| CN | 105329212 A | 2/2016 |
| CN | 105353696 A | 2/2016 |
| CN | 106020177 A | 10/2016 |
| CN | 107580044 A | 1/2018 |
| CN | 109583179 A | 4/2019 |
| JP | 2018-132015 A | 8/2018 |

* cited by examiner

*Primary Examiner* — Thomas D Alunkal

(74) *Attorney, Agent, or Firm* — Oliff PLC

(57) ABSTRACT

An activation system includes: management apparatus configured to manage activation information which is information associated with a vehicle and is information for activation of a vehicle control system, the management apparatus being provided outside the vehicle; and an activation device configured to activate the vehicle control system, the activation device being provided in the vehicle. The management apparatus transmits the activation information to the activation device when the management apparatus receives an activation request signal. The activation device activates the vehicle control system when the activation device receives the activation information from the management apparatus.

4 Claims, 5 Drawing Sheets

FIG. 4

VEHICLE INFORMATION

| VEHICLE ID | AUTHENTICATION INFORMATION |
|---|---|
| V1001 | XXYY |
| V1002 | YYZZ |
| V1003 | ZZXX |
| ⋮ | ⋮ |

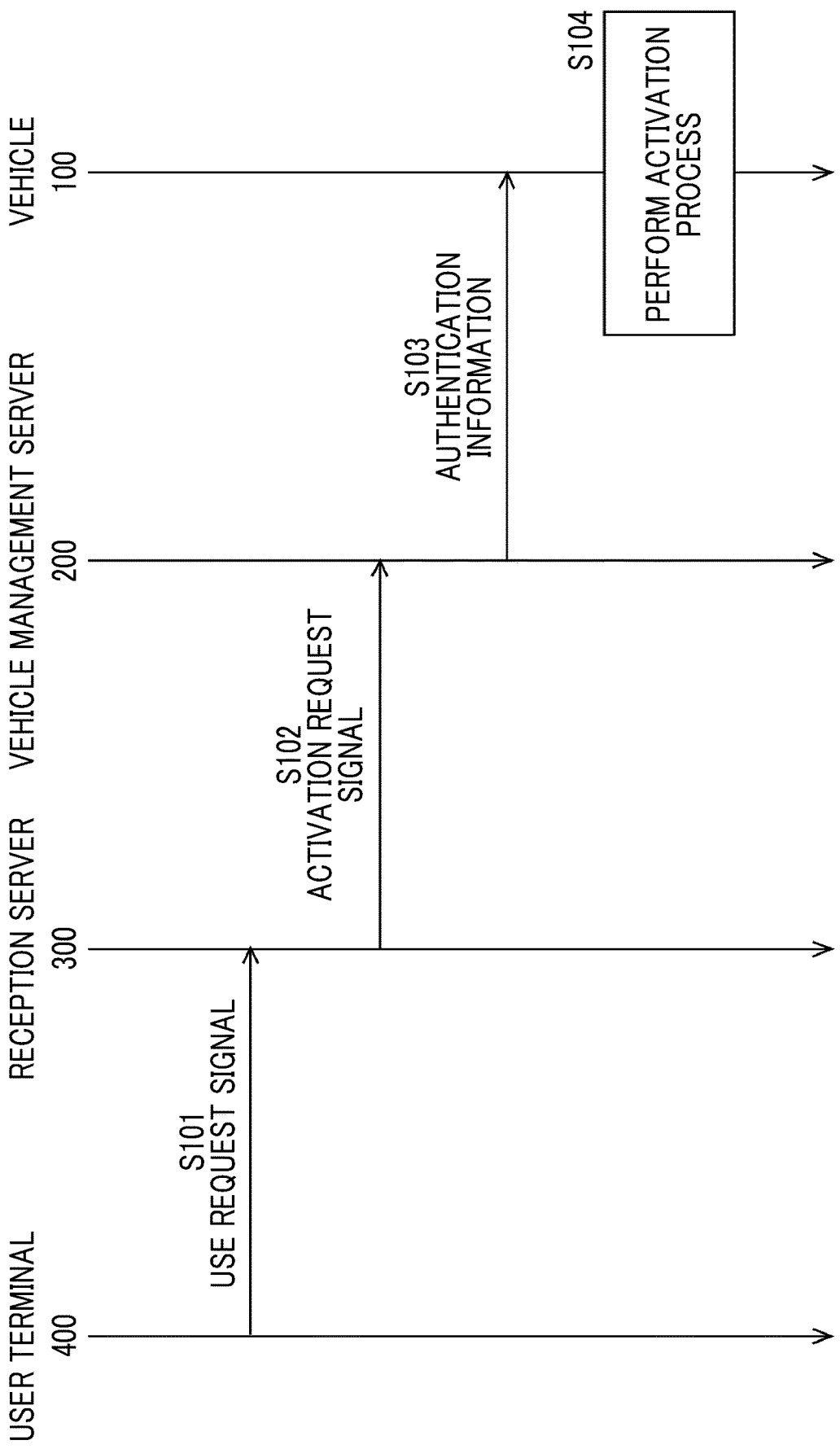

ACTIVATION SYSTEM AND ACTIVATION METHOD

INCORPORATION BY REFERENCE

The disclosure of Japanese Patent Application No. 2019-094026 filed on May 17, 2019 including the specification, drawings and abstract is incorporated herein by reference in its entirety.

BACKGROUND

1. Technical Field

The disclosure relates to an activation system and an activation method for activation of a vehicle control system installed in a vehicle.

2. Description of Related Art

Described in Japanese Unexamined Patent Application Publication No. 2018-132015 (JP 2018-132015 A) is a vehicle system in which an autonomous driving ECU having a function of sensing the vicinity of a vehicle is provided in the vehicle separately from an engine ECU and the autonomous driving ECU issues a command to the engine ECU via a vehicle-mounted network.

SUMMARY

The disclosure provides an activation system and an activation method with which it is possible to improve security in a case where a vehicle control system installed in a vehicle is activated without use of a physical key.

A first aspect of the disclosure relates to an activation system configured to activate a vehicle control system installed in a vehicle. The activation system includes a management apparatus and an activation device. The management apparatus is configured to manage activation information which is information associated with the vehicle and is information for activation of the vehicle control system, the management apparatus being provided outside the vehicle. The activation device is configured to activate the vehicle control system, the activation device being provided in the vehicle. The management apparatus transmits the activation information to the activation device when the management apparatus receives an activation request signal requesting activation of the vehicle control system and the activation device activates the vehicle control system when the activation device receives the activation information from the management apparatus.

A second aspect of the disclosure relates to an activation method of activating a vehicle control system installed in a vehicle in an activation system including a management apparatus configured to manage activation information which is information associated with the vehicle and is information for activation of the vehicle control system and an activation device configured to activate the vehicle control system, the management apparatus being provided outside the vehicle and the activation device being provided in the vehicle. The activation method includes a step of transmitting the activation information to the activation device by the management apparatus when the management apparatus receives an activation request signal requesting activation of the vehicle control system and a step of activating the vehicle control system by the activation device when the activation device receives the activation information from the management apparatus.

According to the aspects of the disclosure, it is possible to improve security in a case where a vehicle control system installed in a vehicle is activated without use of a physical key.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating an example of a table configuration of vehicle information stored in a vehicle information database; and FIG. 5 is a sequence diagram illustrating the flow of information and processing at the time of activation of the vehicle control system installed in the vehicle.

DETAILED DESCRIPTION OF EMBODIMENTS

An activation system according to a first aspect of the disclosure is provided with a management apparatus provided outside a vehicle and an activation device provided in the vehicle. The management apparatus is an apparatus that manages activation information. Here, the activation information is information that is associated with the vehicle and is information for activation of a vehicle control system installed in the vehicle. Note that, "activation" herein means causing the vehicle control system to enter a state where the vehicle control system can cause the vehicle to travel. In addition, the activation device is a device that activates the vehicle control system in the vehicle.

In the activation system according to the aspect of the disclosure, the management apparatus receives an activation request signal requesting activation of the vehicle control system. Here, the management apparatus may receive the activation request signal from a terminal of a user requesting use of the vehicle. In addition, in a case where a reception apparatus that receives a request for use of the vehicle from a user is provided separately, the activation request signal may be received from the reception apparatus. When the management apparatus receives the activation request signal, the management apparatus transmits the activation information to the activation device of the vehicle. When the activation device receives the activation information transmitted from the management apparatus, the activation device activates the vehicle control system in the vehicle. In this manner, the vehicle control system is activated without use of a physical key.

As described above, according to the aspect of the disclosure, when the activation device in the vehicle receives the activation information, it becomes possible to cause the vehicle to travel by means of the vehicle control system. At this time, the activation information is transmitted to the activation device from the management apparatus provided outside the vehicle. Therefore, whether or not the vehicle control system is to be activated (that is, whether or not use of vehicle is to be permitted) can be managed by means of the management apparatus. Accordingly, it is possible to improve security in a case where the vehicle control system installed in the vehicle is activated without use of a physical key.

Hereinafter, a specific embodiment of the disclosure will be described based on drawings. The dimensions, the materials, the shapes, and the relative arrangement of components described in the embodiment are not intended to limit the technical scope of the disclosure unless otherwise noted.

Embodiment

Outline of System

Figure 1:
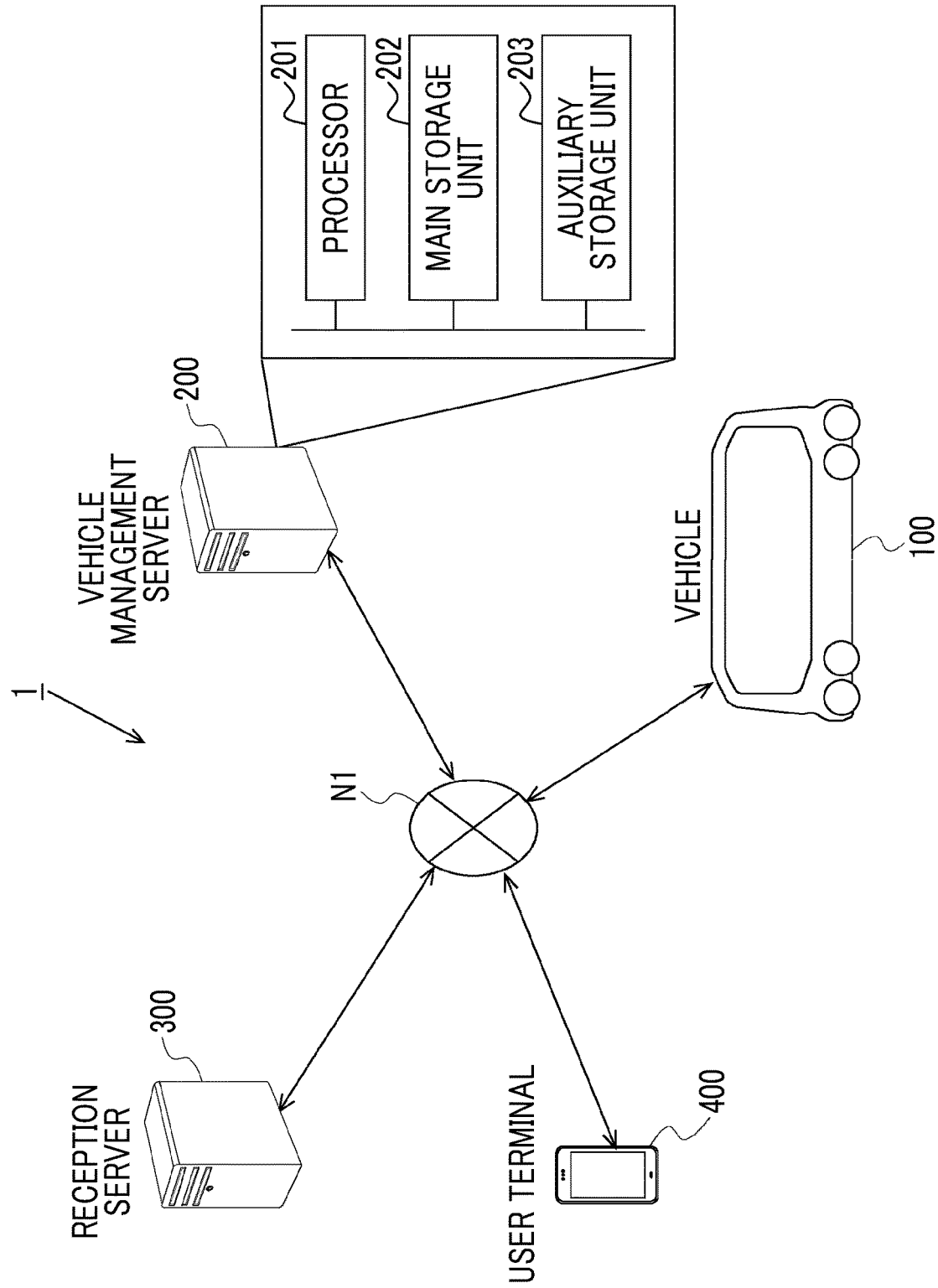
FIG. 1 is a diagram illustrating a schematic configuration of a vehicle management system according to an embodiment.

FIG. 1 is a diagram illustrating a schematic configuration of a vehicle management system according to the present embodiment. A vehicle management system 1 is configured to include a vehicle 100 which is a management target, a vehicle management server 200, a reception server 300, and a user terminal 400. In the vehicle management system 1, the vehicle 100, the vehicle management server 200, the reception server 300, and the user terminal 400 are connected to each other via a network N1. As the network N1, a wide area network (WAN), which is a global public communication network like the Internet, or a telephone communication network for a cellular phone or the like may be adopted. Note that, in the case of the vehicle management system 1, a plurality of the vehicles 100 can be managed.

Figure 2:
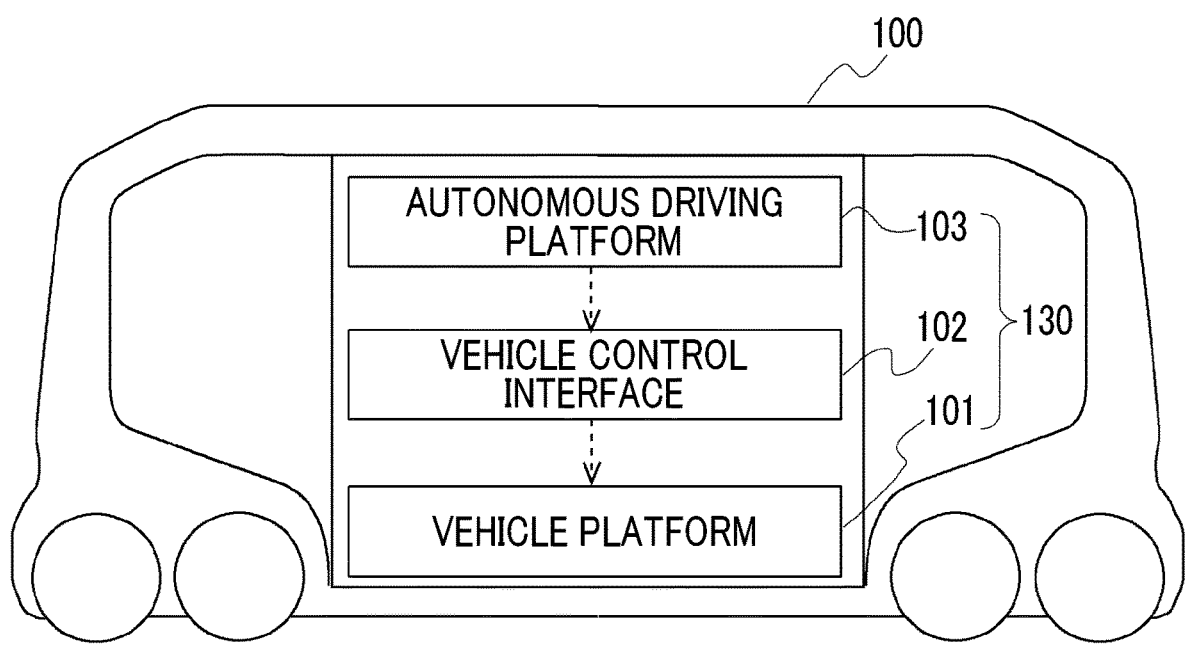
FIG. 2 is a view illustrating a schematic configuration of a vehicle control system installed in a vehicle.

The vehicle 100 is a vehicle that can be autonomously driven. FIG. 2 is a view illustrating a schematic configuration of a vehicle control system installed in the vehicle 100. A vehicle control system 130 is provided with a vehicle platform 101, a vehicle control interface 102, and an autonomous driving platform 103. The vehicle platform 101 includes a group of devices (for example, drive source for vehicle 100 (one or both of motor and engine), steering device, and brake device) for causing the vehicle 100 to travel and a vehicle control ECU which is a computer performing traveling control of the vehicle 100. The vehicle control ECU can control traveling of the vehicle 100 by controlling various devices based on a control instruction. In addition, the vehicle platform 101 may be configured to include a locking and unlocking device that locks or unlocks a door of the vehicle 100. In this case, the locking and unlocking device is also controlled by the vehicle control ECU. Note that, the vehicle control ECU may be a combination of a plurality of computers.

In addition, the autonomous driving platform 103 is a platform for autonomous driving of the vehicle 100. The autonomous driving platform 103 is provided with various sensors that sense the vicinity of the vehicle 100 and an autonomous driving ECU which is a computer that generates a control instruction for autonomous driving of the vehicle 100. The autonomous driving ECU generates the control instruction with respect to the vehicle platform 101 based on the results of sensing operations performed by the various sensors.

The vehicle control interface 102 is a device for communication between the vehicle platform 101 and the autonomous driving platform 103. When the vehicle control interface 102 receives the control instruction from the autonomous driving platform 103, the vehicle control interface 102 transmits the control instruction to the vehicle platform 101. Then, traveling of the vehicle 100 is controlled in the vehicle platform 101 based on the control instruction transmitted from the autonomous driving platform 103 such that autonomous driving of the vehicle 100 is realized. Note that, the vehicle control interface 102 may convert the control instruction generated by the autonomous driving ECU into data that can be interpreted by the vehicle control ECU while the control instruction to be transmitted from the autonomous driving platform 103 to the vehicle platform 101 is being relayed.

The vehicle management server 200 manages authentication information for activation of the vehicle control system 130 of the vehicle 100. In the vehicle 100, the vehicle control system 130 is activated when the authentication information transmitted from the vehicle management server 200 is received.

The vehicle management server 200 is configured to include a general computer. The computer constituting the vehicle management server 200 is provided with a processor 201 such as a CPU or a DSP, a main storage unit 202 such as a read-only memory (ROM) and a random access memory (RAM), and an auxiliary storage unit 203 such as an EPROM, a hard disk drive (HDD), and a removable medium. Here, the removable medium is, for example, a flash memory such as a USB memory or an SD card or a disc recording medium such as a CD-ROM, a DVD disk, and a Blu-ray disk.

In the vehicle management server 200, an operating system (OS), various programs, various information tables, and the like are stored in the auxiliary storage unit 203. In addition, various functions which will be described later can be realized by the processor 201 loading a program stored in the auxiliary storage unit 203 into the main storage unit 202 and executing the program in the vehicle management server 200. Note that, a part or all of the functions of the vehicle management server 200 may be realized by means of a hardware circuit such as an ASIC or an FPGA. Note that, the vehicle management server 200 does not need to be realized by a single physical configuration and may be configured by using a plurality of computers linked to each other.

The reception server 300 is an apparatus that receives a request for use of the vehicle 100 from a user. As with the vehicle management server 200, the reception server 300 is configured to include a general computer. In addition, in response to the request for use of the vehicle 100 from the user, the reception server 300 transmits an activation request signal requesting activation of the vehicle control system 130 installed in the vehicle 100 to the vehicle management server 200.

The user terminal 400 is a terminal operated by the user. Examples of the user terminal 400 include a smartphone, a tablet computer, a mobile computer, a wearable computer, a cellular phone, and a handy terminal. When the user terminal 400 is operated by the user, the user terminal 400 transmits, to the reception server 300, a use request signal indicating a request for use of the vehicle 100 made by the user.

System Configuration

Figure 3:
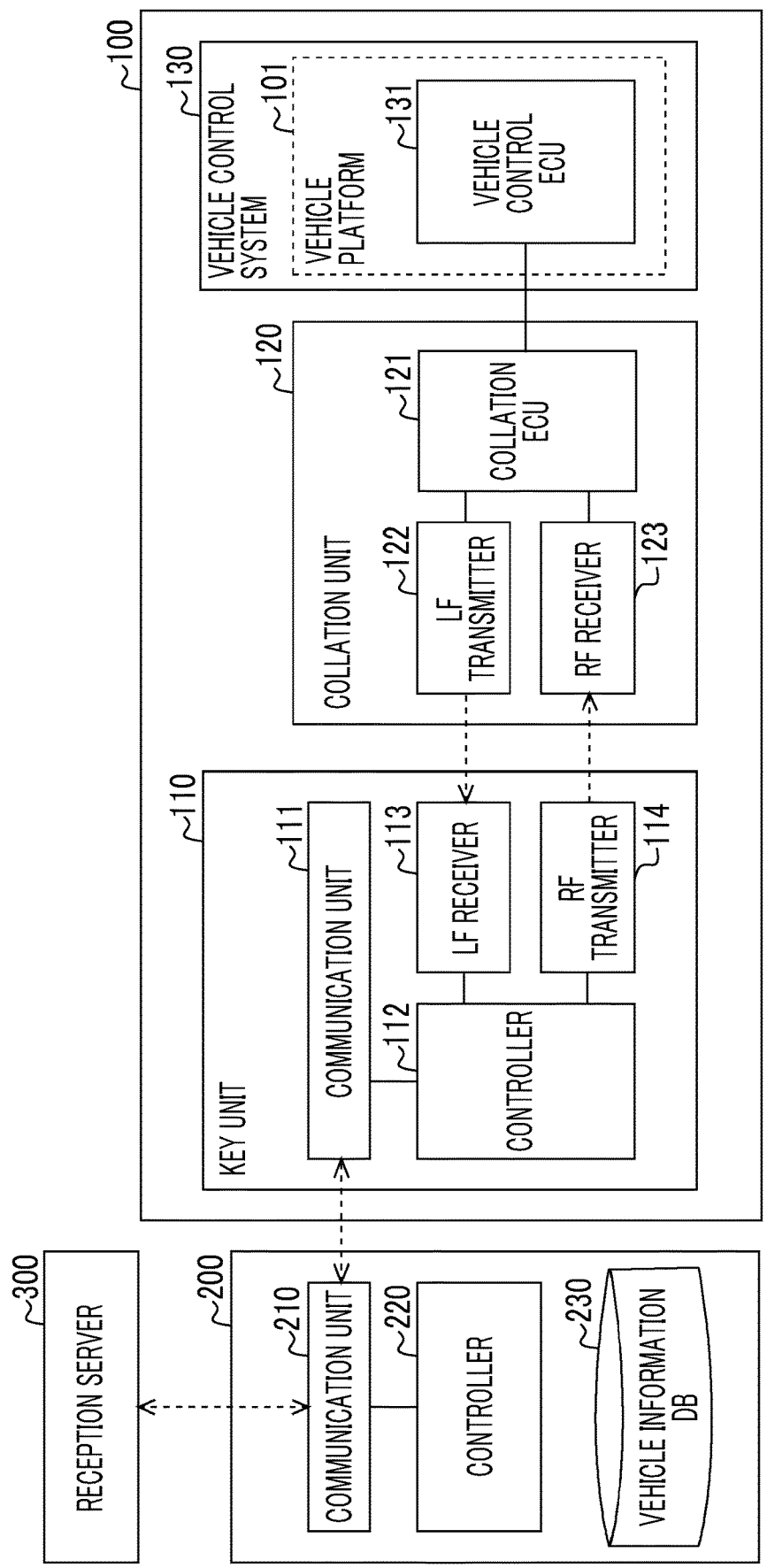
FIG. 3 is a block diagram schematically illustrating an example of the functional configuration of each of the vehicle and a vehicle management server constituting the vehicle management system.

Next, a functional configuration of each of the vehicle 100 and the vehicle management server 200 constituting the vehicle management system 1 according to the present embodiment will be described based on FIG. 3. FIG. 3 is a block diagram schematically illustrating an example of the functional configuration of each of the vehicle 100 and the vehicle management server 200 constituting the vehicle management system 1 according to the present embodiment.

Vehicle

As described above, in the vehicle 100, the vehicle control system 130 provided with the vehicle platform 101, the vehicle control interface 102, and the autonomous driving platform 103 is installed. In addition, the vehicle platform 101 includes a vehicle control ECU 131. Note that, the vehicle control interface 102 and the autonomous driving platform 103 are not shown in FIG. 3.

Furthermore, in the vehicle 100, a key unit 110 and a collation unit 120 are installed. The key unit 110 and the collation unit 120 are devices that perform an activation process for activation of the vehicle control system 130, which will be described later. The key unit 110 communicates with the vehicle management server 200 via the network N1. In addition, the collation unit 120 transmits, to the vehicle control ECU 131, an activation instruction for activation of the vehicle control system 130, in the vehicle 100.

A radio-frequency (hereinafter, referred to as RF) band radio wave and a low-frequency (hereinafter, referred to as LF) band radio wave are transmitted and received between the key unit 110 and the collation unit 120. The collation unit 120 is configured to include an LF transmitter 122, an RF receiver 123, and a collation ECU 121. The LF transmitter 122 is a device that transmits an LF band (for example, 100 KHz to 300 KHz) radio wave for searching for (polling) the key unit 110. The RF receiver 123 is a device that receives an RF band (for example, 100 MHz to 1 GHz) radio wave transmitted from the key unit 110.

The collation ECU 121 is configured by using a microcomputer, for example. In addition, the collation ECU 121 performs a process of transmitting an activation instruction to the vehicle control ECU 131 based on an instruction signal that is transmitted from the key unit 110 via an RF band radio wave. Specifically, first, the collation ECU 121 authenticates that the instruction signal received from the key unit 110 is an instruction signal transmitted from a rightful device. More specifically, collation is performed to determine whether a key ID included in the instruction signal and a key ID that is stored in a storage unit in the collation ECU 121 in advance coincide with each other. When the collation of the key IDs is successful, the collation ECU 121 transmits the activation instruction to the vehicle control ECU 131 via an in-vehicle network such as a controller area network (CAN).

When the vehicle control ECU 131 receives the activation instruction from the collation ECU 121, the vehicle control ECU 131 is activated and the entire vehicle control system 130 is activated. Accordingly, it becomes possible to cause the vehicle 100 to travel by means of the vehicle control system 130. That is, it becomes possible to perform autonomous driving of the vehicle 100. In addition, in a case where the vehicle platform 101 is configured to include the locking and unlocking device that locks and unlocks a door of the vehicle 100, it becomes possible to lock and unlock a door by means of the locking and unlocking device when the vehicle control system 130 is activated.

In addition, the key unit 110 is configured to include a communication unit 111, a controller 112, an LF receiver 113, and an RF transmitter 114. The LF receiver 113 is a device that receives a polling signal that is transmitted from the collation unit 120 via an LF band radio wave. The RF transmitter 114 is a device that transmits an instruction signal to the collation unit 120 via an RF band radio wave.

The communication unit 111 is a communication device for connecting the key unit 110 to the network N1. The communication unit 111 can communicate with other devices including the vehicle management server 200 via the network N1 by means of a third generation (3G) mobile communication service, a long term evolution (LTE) mobile communication service, or the like. In addition, the controller 112 has a function of controlling the communication unit 111, the LF receiver 113, and the RF transmitter 114. The controller 112 is configured by using a microcomputer, for example. The controller 112 performs a process of receiving authentication information transmitted from the vehicle management server 200 via the communication unit 111. In addition, the controller 112 performs a process of receiving a polling signal transmitted from the collation unit 120 by means of the LF receiver 113 and a process of transmitting an instruction signal to the collation unit 120 by means of the RF transmitter 114.

Furthermore, the controller 112 performs authentication of authentication information received from the vehicle management server 200. More specifically, collation is performed to determine whether the authentication information received from the vehicle management server 200 and authentication information that is stored in a storage unit in the controller 112 in advance coincide with each other. Then, when the collation of the authentication information items is successful, the controller 112 transmits an instruction signal to the collation unit 120 by means of the RF transmitter 114. Note that, as described above, the instruction signal transmitted to the collation unit 120 at this time includes a key ID. The key ID may be stored in the key unit 110 in advance in the form of a plaintext and may be stored in a state of being encrypted by means of a unique code corresponding to the vehicle 100. In a case where the key ID is stored in a state of being encrypted, the original key ID may be obtained through decryption of the encrypted key ID that is performed by means of the authentication information received from the vehicle management server 200.

Vehicle Management Server

The vehicle management server 200 is configured to include a communication unit 210, a controller 220, and a vehicle information database (vehicle information DB) 230. The communication unit 210 is a communication device for connecting the vehicle management server 200 to the network N1. The communication unit 210 is configured to include a local area network (LAN) interface board or a wireless communication circuit for wireless communication.

The controller 220 performs a process of receiving an activation request signal transmitted from the reception server 300 via the communication unit 210. In addition, the controller 220 performs a process of transmitting authentication information to the key unit 110 of the vehicle 100 via the communication unit 210.

Here, in the vehicle information DB 230, authentication information associated with each vehicle 100 managed by the vehicle management server 200 is stored. Note that, the vehicle information DB 230 is organized in the auxiliary storage unit 203 of the vehicle management server 200 when a program of a database management system is executed by the processor 201 of the vehicle management server 200. FIG. 4 is a diagram illustrating an example of a table configuration of vehicle information stored in the vehicle information DB 230. As shown in FIG. 4, a vehicle information table includes vehicle ID fields and authentication information fields. In the vehicle ID fields, vehicle IDs, which are identification information for specifying the vehicles 100 are input. In the authentication information fields, authentication information items for the respective vehicles 100 are input.

The activation request signal transmitted from the reception server 300 includes a vehicle ID of the vehicle 100 that is the target of a request for use made by a user (hereinafter, may be referred to as "target vehicle"). The controller 220 extracts authentication information corresponding to the vehicle ID included in the activation request signal, from the vehicle information DB 230. Then, the controller 220 transmits the extracted authentication information to the key unit 110 of the target vehicle.

Flow of Information and Processing

Hereinafter, the flow of information and processing at the time of activation of the vehicle control system 130 installed in the vehicle 100 in the vehicle management system according to the present embodiment will be described based on FIG. 5. FIG. 5 is a sequence diagram illustrating the flow of information and processing at the time of activation of the vehicle control system 130 installed in the vehicle 100.

When a user performs an operation of requesting use of the vehicle 100 with respect to the user terminal 400, the user terminal 400 transmits a use request signal to the reception server 300 (S101). Note that, the use request signal transmitted from the user terminal 400 at this time includes a vehicle ID of a target vehicle, which is the target of a request of use made by the user.

When the reception server 300 receives the use request signal from the user terminal 400, the reception server 300 transmits an activation request signal to the vehicle management server 200 (S102). As described above, the activation request signal transmitted from the reception server 300 at this time also includes a vehicle ID of the target vehicle. When the vehicle management server 200 receives the activation request signal from the reception server 300, the vehicle management server 200 transmits authentication information associated with the target vehicle to the target vehicle (S103).

When the key unit 110 in the target vehicle receives the authentication information transmitted from the vehicle management server 200, the key unit 110 and the collation unit 120 performs the above-described activation process. Accordingly, the vehicle control system 130 of the target vehicle is activated. As a result, it becomes possible for the user to use the target vehicle.

As described above, in the vehicle management system 1 according to the present embodiment, when authentication information is transmitted to the key unit 110 of the vehicle 100 from the vehicle management server 200, the vehicle control system 130 of the vehicle 100 is activated. Therefore, it is possible to activate the vehicle control system installed in the vehicle 100 without use of a physical key. In addition, in the vehicle management system 1, authentication information associated with a target vehicle of which use is requested by a user is transmitted from the vehicle management server 200. Therefore, whether or not the vehicle control system 130 of the target vehicle is to be activated (that is, whether or not use of target vehicle is to be permitted) can be managed by means of the vehicle management server 200. Accordingly, it is possible to improve security in a case where the vehicle control system installed in the vehicle is activated without use of a physical key. In addition, even in a case where the user is not present near the target vehicle, autonomous driving of the vehicle 100 can be performed.

Note that, in the above-described embodiment, the key unit 110 and the collation unit 120 corresponds to an "activation device" according to an aspect of the disclosure. In addition, in the above-described embodiment, the vehicle management server 200 corresponds to a "management apparatus" according to the aspect of the disclosure. In addition, in the above-described embodiment, authentication information that is transmitted from the vehicle management server 200 to the key unit 110 of the vehicle 100 corresponds to "activation information" according to the aspect of the disclosure.

In the above-described embodiment, authentication information transmitted from the vehicle management server 200 to the key unit 110 is transmitted and instruction information including a key ID is transmitted from the key unit 110 to the collation unit 120. However, as an "activation device", a configuration in which such a key unit 110 is not used can also be adopted. That is, a configuration in which the instruction information including the key ID is directly transmitted from the vehicle management server 200 to the collation ECU 121 of the vehicle 100 may also be adopted. In this case, the instruction information including the key ID corresponds to "activation information" according to the aspect of the disclosure.

In addition, in the above-described embodiment, the reception server 300 corresponds to a "reception apparatus" according to the aspect of the disclosure. However, in the vehicle management system 1, the reception server 300 does not need to be provided. That is, a configuration in which an activation request signal for a target vehicle is directly transmitted from the user terminal 400 to the vehicle management server 200 can also be adopted. However, in a case where the vehicle management system 1 is configured to include the reception server 300 in addition to the vehicle management server 200, it becomes easy for a company having the reception server 300 other than a vehicle management company, which is a company having the vehicle management server 200, to manage a request for use of the vehicle 100 made by a user.

In addition, in the above-described embodiment, the vehicle 100 is a vehicle that can be autonomously driven. However, the disclosure can be applied to a vehicle that is driven by being operated by a driver instead of being autonomously driven. In this case, a vehicle control system installed in a vehicle can be configured with the vehicle control interface 102 and the autonomous driving platform 103 removed from the vehicle control system 130 shown in FIG. 2.

Other Embodiment

The above-described embodiments are merely examples and the disclosure can be implemented with appropriate modifications without departing from the gist of the disclosure. In addition, the processes or means described in the disclosure can be freely combined with each other as long as there is no technical contradiction.

In addition, a process that has been described as a process performed by one device may be divided up and performed by a plurality of devices. Alternatively, a process that has been described as a process performed by different devices may be performed by one device. It is possible to flexibly change with what kind of hardware configuration (server configuration) each function is realized in a computer system.

The disclosure also can be realized when a computer program, in which the functions described in the above-described embodiments are mounted, is supplied to a computer and one or more processors of the computer reads and executes the program. Such a computer program may be provided to a computer via a non-temporal computer-readable storage medium that can be connected to a system bus of the computer and may be provided to the computer via a network. Examples of the non-temporal computer-readable storage medium include any type of disk such as a magnetic disk (floppy (registered trademark) disk, hard disk drive (HDD), or like) and an optical disk (CD-ROM, DVD disk, Blu-ray disk, or like), a read-only memory (ROM), a random access memory (RAM), an EPROM, an EEPROM, a magnetic card, a flash memory, an optical card, and any type of medium suitable for storing electronic commands.

What is claimed is:

1. An activation system configured to activate a vehicle control system installed in a vehicle, the activation system comprising:
   a reception apparatus configured to receive a use request for use of the vehicle from a user;
   a management apparatus configured to manage activation information which is information associated with the vehicle and is information for activation of the vehicle control system, the management apparatus being provided outside the vehicle; and
   an activation device configured to activate the vehicle control system, the activation device being provided in the vehicle, wherein:
   the reception apparatus transmits an activation request signal to the management apparatus requesting activation of the vehicle control system in response to receiving a use request signal indicating the use request from a terminal of the user,
   in response to receiving the activation request signal from the reception apparatus, the management apparatus extracts authentication information associated with the vehicle and transmits the activation information including the authentication information to the activation device, and
   the activation device activates the vehicle control system in response to receiving the activation information from the management apparatus.

2. An activation method of activating a vehicle control system installed in a vehicle in an activation system including (i) reception apparatus configured to receive a use request for use of the vehicle from a user, (ii) a management apparatus configured to manage activation information which is information associated with the vehicle and is information for activation of the vehicle control system and (iii) an activation device configured to activate the vehicle control system, the management apparatus being provided outside the vehicle, the activation device being provided in the vehicle, and the activation method comprising:
   transmitting, by the reception apparatus, an activation request signal to the management apparatus requesting activation of the vehicle control system in response to receiving a use request signal indicating the use request from a terminal of the user;
   in response to receiving the activation request signal from the reception apparatus, extracting, by the management apparatus, authentication information associated with the vehicle and transmitting, by the management apparatus, the activation information including the authentication information to the activation device; and
   a step of activating, by the activation device, the vehicle control system in response to receiving the activation information from the management apparatus.

3. The activation system according to claim 1, wherein the activation device performs authentication of the authentication information included in the received activation information and activates the vehicle control system only when the authentication is successful.

4. The activation method according to claim 2, further comprising
   authenticating, by the activation device, the authentication information included in the received activation information and activating the vehicle control system only when the authenticating is successful.

* * * * *